Patented Dec. 28, 1937

2,103,505

UNITED STATES PATENT OFFICE 2,103,505

PRODUCTION OF POLYMERS OF KETENE AND PREPARATION OF ESTERS THEREOF

Peter J. Wiezevich and Anthony H. Gleason, Elizabeth, N. J., assignors to Standard Oil Development Company, a corporation of Delaware No Drawing. Application April 17, 1934, Serial No. 720,946

7 Claims. (Cl. 260—101)

This application is a continuation in part of the pending application Serial No. 559,936 now Patent 1,998,404 of Peter J. Wiezevich and Anthony H. Gleason, filed August 28, 1931, for the production of polymers of ketene and preparation of esters thereof.

The invention herein claimed relates to the utilization of polymerization products of ketenes. More particularly, it relates to the employment of the dimer of ketene, cyclobutane 1:3 dione, in the manufacture of commercially valuable products.

In our original application, Serial No. 559,936 filed on August 28, 1931, a method has been described for the preparation in high yields of cyclobutane 1:3 dione, presumably having the formula

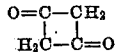

by the polymerization of ketene ($CH_2:CO$).

This is accomplished by subjecting ketene to pressures higher than atmospheric such as 2 to 200 atmospheres and under suitable conditions. It has been found preferable to allow the compressed ketene to stand in contact with a metallic surface at moderately low temperatures. As an example, ketene formed by the pyrolysis of acetone, was separated from acetone by cooling with solid carbon dioxide-alcohol mixture, liquefied by cooling with liquid air, introduced into a steel bomb and allowed to warm up to room temperature under its own pressure. After standing approximately 8 to 12 hours, the products of the bomb contained cyclobutane 1:3 dione corresponding to a yield of 85% of the theoretical yield. Other metals such as copper, chrome nickel steel, etc., may be employed. The ketene, instead of being liquefied by cooling, as in the example given, may be compressed into the metal container by a compressor or the like at a temperature of about 0° C. to 100° C.

The cyclobutane 1:3 dione (boiling point being about 127° C.) so prepared, may be considered as the anhydride of aceto-acetic acid since it reacts with water to give aceto-acetic acid. The present invention deals with treating this dimer as well as any other polymerization products of ketene under suitable conditions causing it to react with various other compounds. As an example, cyclic and/or aliphatic hydroxy compounds were heated at moderate temperatures such as approximately 25° C. to less than 127° C. with cyclobutane 1:3 dione, preferably in the presence of small amounts of catalysts, for example mineral acids such as hydrochloric acid, etc. or metallic salts such as sodium bisulfate, etc., to give esters known as aceto-acetates. If the reaction is performed under pressures greater than atmospheric, temperatures higher than 127° C. may be employed. A yield of 80 to 85 percent of aceto-acetic ester of ethyl alcohol was obtained in this manner. Similarly, aceto-acetic esters of other aliphatic alcohols, including the di- and tri-hydric alcohols, may be prepared. Phenyl aceto-acetate has also been prepared in a similar manner from phenol with satisfactory yield. Other phenolic or aromatic hydroxy compounds, such as the xylols and cresols, may also be used. Cellulose ester films were also prepared by treating activated cellulose with the ketene polymer, cyclobutane 1:3 dione, in the presence of an inert solvent, such as acetone, chloroform, etc.

Example 1

When cyclobutane 1:3 dione is treated with an excess of alcohol and a trace of sulfuric acid, only traces of the ester could be found, and at the end of 10 days the odor of the dimer from the reaction mixture was still pronounced.

Another sample of the dione (37 g.) obtained by polymerizing ketene in a metal container under pressure was heated on a steam bath (100° C.) with 40 g. of absolute ethyl alcohol and 0.3 g. of sulfuric acid for 3 hours. In spite of the thermal instability of the polymer, a yield of 80-85% of ethyl aceto-acetate, boiling at 68° C. at 10 mm. pressure was obtained by washing the reaction product with saturated salt solution, drying, filtering, and distilling under vacuum.

Example 2

About 15 cc. of phenol in ether solution was treated with 15 cc. of the products (obtained by polymerization of ketene under pressure in a steel container), and a trace of sulfuric acid was added. The reaction was so violent as to cause the mixture to boil over. Distillation of the red liquid gave 15-20 cc. of a product boiling at 139° C. at 7 mm. The phenyl aceto-acetate so obtained could be employed as a plasticizer.

Example 3

Some cotton was "activated" and then treated with a chloroform solution of cyclobutane 1:3 dione. The fibers began to turn yellow immediately and in a few minutes the mixture had a deep red color and soon became thick and pasty and the resulting cellulose aceto-acetate was separated and allowed to dry in the form of a thin tough film.

The foregoing description is merely illustrative and various changes and alternative arrangements may be made within the scope of the appended claims in which it is our intention to claim all novelty inherent in the invention as broadly as the prior art permits.

We claim:

1. Method of preparing esters comprising reacting aliphatic poly-hydroxy alcohols with the products obtained by the polymerization of ketene in presence of an acid esterification catalyst.

2. Method of preparing aceto-acetic esters comprising contacting cyclobutane 1:3 dione with an aliphatic poly-hydroxy alcohol in presence of an acid esterification catalyst.

3. Method according to claim 2 in which the hydroxy compound is an aliphatic alcohol of the group consisting of di- and tri-hydric alcohols.

4. Method according to claim 2 in which a temperature below approximately 127° C. is used.

5. Method according to claim 2 in which the contacting is done in the presence of an inert solvent.

6. Method of preparing cellulose aceto-acetate which comprises contacting cyclobutane 1:3 dione with cellulose material in presence of an acid esterification catalyst.

7. Cellulose aceto acetate.

PETER J. WIEZEVICH.
ANTHONY H. GLEASON.